Nov. 10, 1936.  W. B. SCHOFIELD  2,060,127

EYE PROTECTOR

Filed Feb. 6, 1934

INVENTOR
William B. Schofield
BY C. P. Goepel.
his ATTORNEY

Patented Nov. 10, 1936

2,060,127

UNITED STATES PATENT OFFICE 2,060,127

EYE PROTECTOR

William B. Schofield, New York, N. Y.

Application February 6, 1934, Serial No. 709,931

8 Claims. (Cl. 2—12)

My invention relates to the type of eye protectors commonly known as glare shields, and the object of my invention is to provide such a device characterized by the fact that it comprises an article of manufacture made in the form of a headpiece having means adapted to intercept blinding light beams and render the same harmless to natural vision.

With the great increase in night-time motor-car traffic, there is an excess in accidents, due not alone to careless driving and heavy traffic, but also to the inability of the eyes to withstand the piercing headlight beams that seriously hamper normal vision and lower the reflexes. On many highways, the constant succession of intense headlight beams has the effect of impairing vision, reducing perceptivity and dulling the physical sensibility of the brain so that distances and night shadows are misjudged.

It is known to provide various types of glare shields and to attach the same to the windshields or their frames, or to the frame parts of the motor vehicles, but these devices have the disadvantage that they are too far from the eyes to accomplish the best results, that they do not intercept beams of light from all angles, and that after being employed for a short time their use is usually discarded because of the physical effort necessary to locate or position them in the moment of need, which effort detracts from the regular duties of the driver.

The purposes and objects of my present invention are to provide a simple, light-weight headpiece and visor combination for night-time driving or for driving in a beam of intense sunlight and which will constitute an efficient protection for the eyes and will overcome in general the above-mentioned objections and drawbacks to safety.

More specifically considered, my invention comprises an article which is detachably applied to the head of a person to move therewith and so that in the instant of need by a quick and natural movement of the head the shield or visor may be brought practically instantaneously into position to intercept a beam of light. The article is made for use either with or without eye glasses or spectacles and is readily adjustable to suit different sizes of heads. By a mere touch of the finger, its shield part is independently adjustable through a wide range of adjustment. The shield is preferably made of light weight substance capable of affording a clear natural vision while efficiently protecting the eyes from glare.

In the construction of my new device, which is readily clasped to the head and removed, even while driving the car, I have combined numerous features having to do with simplicity of parts, facility in their assembly and operation in the replacement of the elastic head-attaching means which is subject to more or less strain and deterioration.

The nature of the general principles and objects above referred to, as well as other and additional objects and advantages which will be apparent as the description proceeds, and the manner in which they may be embodied in concrete form and means, will be explained in the following detailed description of the particular combination and construction herein illustrated as an example, and to which reference is now directed.

In the drawing, in which similar characters of reference indicate corresponding parts throughout the several views:—

Figure 1:
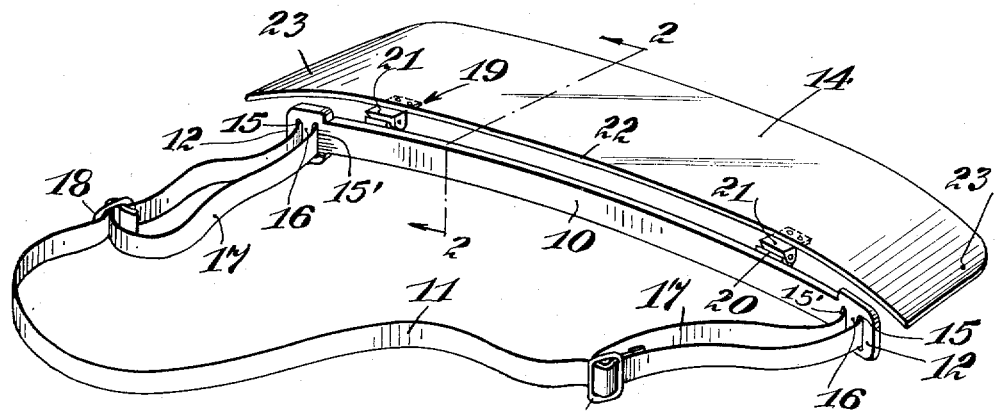
Figure 1 is a perspective view of an eye protector made in accordance with my invention.
Figure 2:
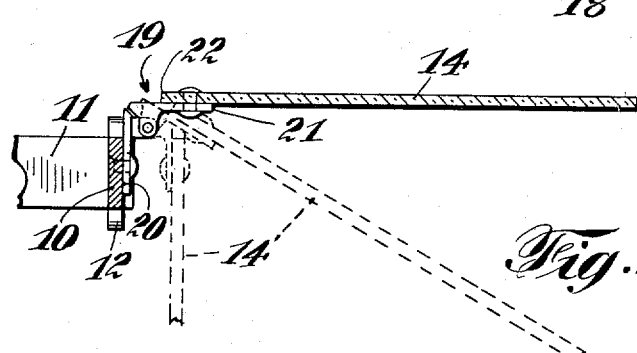
Fig. 2 is a cross section taken on the line 2—2 of Fig. 1, and showing in addition in dot-dash lines the range of adjustment of the shield with respect to its foundation supporting member.
Figure 3:
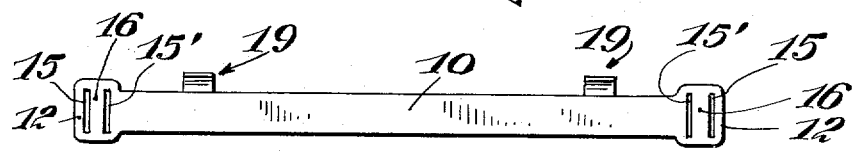
Fig. 3 is a plan view of the shield supporting member or strip.

In describing my invention, the terms and expressions which I use are employed as terms of description and not of limitation, and I have no intention, in the use of such terms and expressions, of excluding any equivalents of the features shown and described or portions thereof.

Referring now in detail to the accompanying drawing, it will be seen that the article comprises in general a headpiece adapted to encircle the head of the wearer and which is composed of an elongated strip or bar 10 shaped to rest in its longitudinal direction against the forehead in a position transversely of the head and in plane substantially parallel with the horizontal plane of the eyes, and of an elastic string or tape 11 connected with the opposite ends or terminals 12 of the strip and which is adapted to be engaged around the head on a line well above the ears where, if the wearer uses spectacles, there will be no interference with the application or removal of the temples 13 of the spectacles.

The strip or bar 10 is made of any suitable light-weight material such as horn, cellulose acetate, fiber, or any other relatively rigid light-weight material adapted to serve as a foundation member for carrying the glare shield 14. The elastic securing string 11 may be connected with the terminals of the strip 10 in any suitable manner, but I prefer to employ the simple, practical and convenient mode of attachment illustrated in the drawing and which consists in providing each of the terminals with a pair of vertically extending apertures or slots 15, 15' separated by a partition 16. The elastic securing string is applied to each terminal by passing its end portion 17 forwardly through the aperture 15, across the front of the partition 16 and then rearwardly through the other aperture 15', and finally detachably securing the end of such portion in a buckle member 18 provided for the purpose on the main body of the string. In this arrangement, the length of the apertures 15 15' are substantially greater than the width of the string or tape in order to make provision for free sliding movement of the tape through the eyes and across the partition. This mode of attachment provides a number of advantages. By manipulating either one or both of the buckles 18 along the body of the string away from or toward their respective terminals, the string may readily be shortened or lengthened in order properly to fit different sizes of heads. Again, by adjusting the buckles in the proper direction along the string, the latter will be subjected to a tightening strain whereby, irrespective of the size of the head, to maintain the strip 10 firmly against the forehead so that there will be no slipping of the article downwardly upon the eyebrows or in a position to interfere with eye glasses or spectacles when worn by the wearer of my eye-protecting article. A further advantage resides in the fact that when the string becomes worn or the rubber therein deteriorates, it may be readily removed from the strip and replaced by a new string. This avoids the necessity of purchasing a new eye-protecting device when the string through service or deterioration becomes ineffective to properly maintain the strip in place against the forehead.

The glare shield 14 comprises a light-weight sheet of composition material, preferably of cellulose acetate because this material is not readily inflammable or breakable and because in the manufacture of this material it is well known to tint it with pigment so as to provide a transparent or translucent sheet that will protect the eyes against intense light while permitting a clear natural vision. However, while I prefer for the reasons mentioned to provide a glare shield composed of cellulose acetate, it will be understood that I am not confined to this particular kind of material, but may employ for this purpose any suitable light-weight material belonging to the celluloid group or family, or I may even employ colored glass.

The glare shield sheet is attached directly to the strip 10 by means of hinge connections denoted in general by the reference characters 19. These hinge connections may suitably be of any well known type such as are commonly used for the temple connections of spectacles the hinge parts or hinge ears of which have such frictional bearing engagement with each other that while they may be manually moved for adjustment, they will nevertheless stay in the position to which adjusted due to the frictional bearing engagement between their cooperating hinge or ear parts. In the present embodiment, it will be seen that the hinge connections 19 include leaves 20 which may be secured by rivets or equivalent means to the outer face of the strip 10, and of leaves 21 which may be similarly secured to the inner face of the shield 14 adjacent the edge 22 thereof, and in this connection it will be noted that these hinges thus connect the shield with the strip at points spaced inwardly from the terminals 12 of the strip. It will also be noted that the hinges intervene between the front face of the strip 10 and the adjacent face of the glare shield so as to hold the latter spaced from the front face of the strip, the edge 22 lying throughout its length a spaced distance forwardly beyond the strip so as to provide between the strip and shield an elongated gap or space of substantial width for the free circulation of air up and down along the forehead and face of the wearer.

As previously intimated, the strip is shaped or curved longitudinally in general conformity with the transverse outline of the forehead of a person, and the shield 14 for that portion of the length thereof existent between and including the two hinge connections, is shaped or curved in substantial conformity with the shape or curvature of the strip. The opposite or outer end portions 23 of the shield are bent rearwardly and to an extent sufficient to protect the right and left fields of vision. In general the size and shape of the shield is such that it will protect the eyes from light rays or beams approaching from any direction, that is, from the front, from the right and left fields of vision, and from reflections in the mirror of light beams emanating from vehicles approaching from behind or at the side. Because of the arrangement of the hinge connections, the shield has a wide range of movement, it being movable from an elevated or horizontal position in which it lies in a plane substantially at right angles to the vertical plane of the strip, to a lowered position in which it lies in a vertical plane substantially parallel with the vertical plane of the strip. These are the extreme positions which define the range of independent movement of the shield and it will be recognized that between these two extremes of movement the shield will be maintained by the frictional hinges in any angular position to which it is moved. According to another feature of my invention, the strip 10 is of such built-out or cross-sectional dimension between its inner surface which rests against the forehead and its outer surface to which the hinges are connected, that the shield in its lowered position will not interfere with or displace in any way eye glasses or spectacles which may be worn by the wearer of the eye protector. With the string 11 stretched or tensioned on the head, the flexible strip 10 is flexed longitudinally to conform to and lie flat against the forehead, and the flexible shield 14, due to the arrangement and relation of the hinges, is also flexed longitudinally to correspond substantially with the flexing of the strip and while preserving the elongated air gap or space formed between these parts. The inherently flexible strip and shield parts are maintained in longitudinal flexed condition to conform to and suit the size and shape of the forehead and head by the pulling force of the elastic element when the latter is tensioned on the head, and these parts, if they are produced from cellulose acetate or the like, are incapable of resuming their original position by force of inherent flexibility, until released by removing the string from head or by destroying the effective pulling force of the string through loosening or adjusting the buckles thereon.

Figure 4:
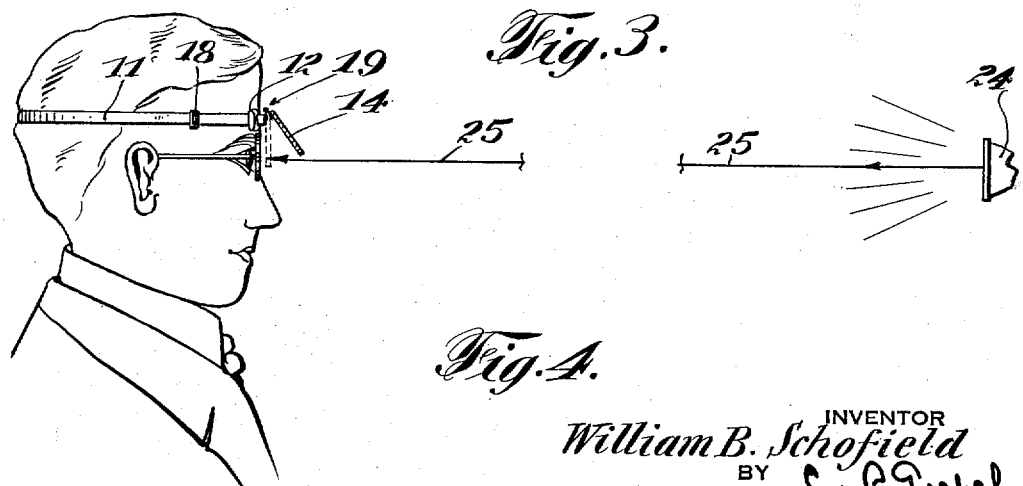
Fig. 4 is a side elevational view, more or less diagrammatic in character, showing my eye protector applied on the head of a person.

In Fig. 4, I show diagrammatically how the shield, when once suitably adjusted, may be used to intercept a beam of light or the line of vision by a mere movement of the head. In this illustration, 24 denotes a source of light and 25 the line of vision between the eyes and the source of light. If now, the glare shield 14 be adjusted to the position shown relative to the line of vision, it will be evident that a slight down-swing or lowering movement of the head will bring the shield across the line of vision so as to protect the eyes from the rays of light. It will also be evident that a slight up-swing or elevating movement of the head will move the shield upwardly from the line of vision. By down and up movements of the head are meant tilting the head downwardly and forwardly toward the chest and upwardly and rearwardly away from the chest. When, therefore, the shield is once adjusted in its proper angle with respect to the line of vision, it is unnecessary manually to change the angular position of the shield, since a mere movement of the head will, as occasion requires, be sufficient to intercept the intense light beam and protect the eyes. It is also desired to point out in this connection that with a mere touch of the finger the angular position of the shield may at any time be re-adjusted as changing conditions require in order that, by a mere movement of the head, light beams from any direction may be intercepted.

As compared with hitherto known shields, my device is detachably engaged with the head to move therewith while the visor or shield is attached for independent movement or adjustment. The shield, without attachment to eye glasses or spectacles and without interfering with the focus of eye glasses or spectacles, when worn, is maintained close to the eyes so as to instantly engage a beam approaching the eyes from any direction including the right and left fields of vision. The string which is slidably engaged with the strip may be adjusted so as to maintain the strip firmly in place against displacement irrespective of the movements of the head and of the adjustment of the shield relatively to the strip.

The foregoing detailed description has been given for clearness of understanding only, and no unnecessary limitations should be understood therefrom, but the appended claims should be construed as broadly as possible in view of the prior art.

I claim:—

1. In a device for protecting the eyes from intense light, a headpiece adapted to surround the head, including an elongated strip bendable to suit the head, an elastic securing string loosely engaged in eyes in each end of said strip, means combined with the string for subjecting the same to a tightening strain whereby to maintain the strip longitudinally bent to lie flat against the forehead, and a glare shield for modifying light glare attached to and bendable longitudinally with said strip and independently movable into position across the line of vision.

2. In a device for protecting the eyes from intense light, a headpiece adapted to surround the head, having a bendable strip for engaging the forehead in a position transversely of the head and a string with means subjecting it to a tightening strain whereby to maintain the strip bent longitudinally to conform to and lie flat against the forehead, and a shield for modifying light glare attached to said strip and bendable longitudinally therewith and independently movable into position across the line of vision, said shield having bendable component parts for intercepting the right and left fields of vision.

3. In an eye protector which includes an elastic string and a thin elongated strip adapted together to surround the head of the wearer, said strip being bendable in its longitudinal direction to lie against the forehead in a position transversely of the head, the end portions of said strip having apertures therein and said string being threaded through said apertures for subjecting the strip to bending strain from such end portions, spaced members projecting beyond the front surface of the strip, and a thin elongated shield sheet attached to said members and spaced thereby from the front face of said strip so as to provide an elongated air space of substantial width for the passage of air between the shield sheet and strip, said sheet being bendable longitudinally to conform substantially with the bending of the strip.

4. An eye protector having a head engaging elastic string, a thin elongated forehead engaging strip attached adjacent its opposite ends to the elastic string and bendable lengthwise under strain of the elastic string to conform to the curvature of the forehead and adapted to lie flat thereagainst, and a thin elongated glare shield supported in association with said strip, said glare shield being bendable and for the extent of its length lying forwardly beyond said strip so as to provide an elongated ventilating space of substantial width intervening between it and the strip and along the forehead of the wearer.

5. An eye protector comprising a thin flexible elongated strip adapted to be placed horizontally against the forehead, an elongated elastic element for the head attached to the strip adjacent the opposite ends of the latter whereby a tightening strain of the elastic element on the head will cause longitudinal flexing of the strip in tight frictional contact with the forehead, a thin flexible elongated glare shield, connections between the strip and glare shield supporting the latter separated from the former by an intervening air space interrupted only by the connections, the connections being so arranged between the two flexible parts that as the strip is flexed in applied position by force of the elastic element the glare shield will also be flexed with it in a corresponding direction and maintain the existence of the intervening air space.

6. An eye protector comprising a thin flexible elongated strip adapted to be placed horizontally against the forehead, an elastic head-engaging string attached to the strip adjacent the opposite ends thereof and adapted when tensioned on the head to put the strip under strain and flex the same lengthwise to conform to and lie flat against the forehead, a thin flexible elongated glare shield, connections between the strip and glare shield retaining the latter separated from the former by an intervening air space interrupted only by the connections themselves, said connections being so arranged that when the strip is flexed in lengthwise direction by the string the glare shield will also be flexed lengthwise correspondingly substantially with the flexing of the strip, said strip and glare shield during the time they are thus flexed lengthwise in applied relation by the strain of the string being incapable of resuming their original position by force of inherent flexibility.

7. An air-circulating eye protector having thin elongated separate members lengthwise bendable to suit the horizontal curvature of the forehead, one of the members comprising a relatively narrow strip adapted to be engaged against the forehead and the other member comprising a glareshield sheet, and parts between the strip and sheet supporting the latter by the former, said parts in the direction of the length of the strip and sheet being spaced a distance from each other and connected to the strip and sheet the sheet being spaced a distance from the front surface of the strip to provide an elongated space of substantial width through which air may freely circulate between the strip and sheet.

8. An air-circulating eye protector comprising means adapted to be engaged with the head of the wearer and including an elongated member disposable against the forehead in a position transversely of the wearer's head, an elongated glareshield, and means carried by the member supporting the glareshield in spaced lengthwise relation forwardly in front of the member, said means comprising a pair of supporting elements affording spacers secured to and between the member and glareshield in fixed spaced apart relation from each other, both said member and glareshield being formed of relatively thin material bendable lengthwise to suit the horizontal curvature of the forehead, with said supporting elements maintaining the glareshield and member during the lengthwise bending thereof.

WILLIAM B. SCHOFIELD.

CERTIFICATE OF CORRECTION.

Patent No. 2,060,127.  November 10, 1936.

WILLIAM B. SCHOFIELD.

It is hereby certified that error appears in the printed specification of the above numbered patent requiring correction as follows: Page 2, first column, line 52, for "agains" read against; page 4, second column, line 14, claim 8, after the word "member" insert spaced; and that the said Letters Patent should be read with these corrections therein that the same may conform to the record of the case in the Patent Office.

Signed and sealed this 12th day of January, A. D. 1937.

Henry Van Arsdale (Seal)  Acting Commissioner of Patents.

7. An air-circulating eye protector having thin elongated separate members lengthwise bendable to suit the horizontal curvature of the forehead, one of the members comprising a relatively narrow strip adapted to be engaged against the forehead and the other member comprising a glareshield sheet, and parts between the strip and sheet supporting the latter by the former, said parts in the direction of the length of the strip and sheet being spaced a distance from each other and connected to the strip and sheet the sheet being spaced a distance from the front surface of the strip to provide an elongated space of substantial width through which air may freely circulate between the strip and sheet.

8. An air-circulating eye protector comprising means adapted to be engaged with the head of the wearer and including an elongated member disposable against the forehead in a position transversely of the wearer's head, an elongated glareshield, and means carried by the member supporting the glareshield in spaced lengthwise relation forwardly in front of the member, said means comprising a pair of supporting elements affording spacers secured to and between the member and glareshield in fixed spaced apart relation from each other, both said member and glareshield being formed of relatively thin material bendable lengthwise to suit the horizontal curvature of the forehead, with said supporting elements maintaining the glareshield and member during the lengthwise bending thereof.

WILLIAM B. SCHOFIELD.

CERTIFICATE OF CORRECTION.

Patent No. 2,060,127.                                       November 10, 1936.

WILLIAM B. SCHOFIELD.

It is hereby certified that error appears in the printed specification of the above numbered patent requiring correction as follows: Page 2, first column, line 52, for "agains" read against; page 4, second column, line 14, claim 8, after the word "member" insert spaced; and that the said Letters Patent should be read with these corrections therein that the same may conform to the record of the case in the Patent Office.

Signed and sealed this 12th day of January, A. D. 1937.

Henry Van Arsdale (Seal)                                            Acting Commissioner of Patents.

CERTIFICATE OF CORRECTION.

Patent No. 2,060,127.                                              November 10, 1936

WILLIAM B. SCHOFIELD.

It is hereby certified that error appears in the printed specification of the above numbered patent requiring correction as follows: Page 2, first column, line 52, for "agains" read against; page 4, second column, line 14, claim 8, after the word "member" insert spaced; and that the said Letters Patent should be read with these corrections therein that the same may confo to the record of the case in the Patent Office.

Signed and sealed this 12th day of January, A. D. 1937.

Henry Van Arsdale (Seal)                                                         Acting Commissioner of Patents.